United States Patent
Ballevre et al.

(10) Patent No.: US 6,833,350 B2
(45) Date of Patent: Dec. 21, 2004

(54) METHOD FOR MAINTAINING OR IMPROVING THE SYNTHESIS OF MUCINS

(75) Inventors: Olivier Ballevre, Lausanne (CH); Paul-Andre Finot, St. Legier (CH); Denis Breuille, Saint-Saturnin (FR)

(73) Assignee: Nestec S.A., Vevey (CH)

( * ) Notice: Subject to any disclaimer, the term of this patent is extended or adjusted under 35 U.S.C. 154(b) by 257 days.

(21) Appl. No.: 09/774,814

(22) Filed: Jan. 30, 2001

(65) Prior Publication Data

US 2001/0031723 A1 Oct. 18, 2001

Related U.S. Application Data

(63) Continuation-in-part of application No. 09/498,905, filed on Feb. 4, 2000, now abandoned.

(51) Int. Cl.$^7$ .................. A23C 17/00; A23C 21/00; A23D 7/00
(52) U.S. Cl. ................ 514/2; 530/300; 530/350; 530/395; 426/23; 426/33; 426/41; 426/583
(58) Field of Search ................. 530/300, 350, 530/395, 375, 372; 514/8, 2; 426/23, 33, 41, 583, 648

(56) References Cited

U.S. PATENT DOCUMENTS

| | | | |
|---|---|---|---|
| 5,356,873 A | | 10/1994 | Mark et al. |
| 5,728,678 A | * | 3/1998 | Trimbo et al. ............ 514/12 |
| 5,780,451 A | | 7/1998 | DeMichele et al. |
| 5,916,621 A | * | 6/1999 | Georgi et al. ............ 426/583 |
| 6,187,558 B1 | * | 2/2001 | Granados et al. .......... 435/69.1 |
| 6,468,987 B1 | * | 10/2002 | Demichele et al. ........... 514/54 |
| 2002/0151491 A1 | * | 10/2002 | Li et al. .................. 514/12 |

OTHER PUBLICATIONS

Pearson, G. R. et al. (1987) Mucosal changes associated with abomasal ulceration in veal calves. Vet. Rec. vol. 121, pp. 557–559.*

Hennebicq–reig, S. et al. (1998) Permanent exposure of mucin–secreting HT–29 cells to benzyl–N–acetyl–alpha–D–galacto–saminide induces abnormal O–glycosylation of mucins and inhibits constitutive and stimulated MUC5AC secretion. Biochem J. 334, 283–295.*

Bertolo, R. F. P. et al. (1998) Threonine requirement of neonatal piglets receiving total parenteral nutrition is considerably lowe than that of piglets receiving an identical diet intragastrically. J. Nutr. vol. 128, pp. 1752–1759.*

Dwarakanath et al., Accession No. 95402810, Gut, vol. 37, No. 1 pp. 58–62.

Neutra, M.R. et al., Physiology of the Gastrointestinal Tract, Second Ed., Raven Press, Ny, pp 975–1009.

Tse, S.L et al., Infection and Immunity, vol. 60, No. 4, 1992, pp 1603–1612.

* cited by examiner

Primary Examiner—Karen Cochrane Carlson
Assistant Examiner—Samuel Wei Liu
(74) Attorney, Agent, or Firm—Bell, Boyd & Lloyd LLC

(57) ABSTRACT

Methods for maintaining, improving or increasing the synthesis of mucins by administering a nutritional composition or supplement that contains a therapeutically effective amount of threonine are provided. The present invention further provides methods for treating a variety of disease states characterized by alterations to the mucin levels, such as, intestinal inflammatory and bacterial infections or other like disease states.

40 Claims, 1 Drawing Sheet

METHOD FOR MAINTAINING OR IMPROVING THE SYNTHESIS OF MUCINS

The present application is a continuation-in-part application of U.S. patent application Ser. No. 09/498,905 filed on Feb. 4, 2000.

BACKGROUND OF THE INVENTION

This invention generally relates to methods for maintaining, improving or increasing the synthesis of mucins, especially in the gastrointestinal tract and lungs. The invention further relates to maintaining, improving or increasing the synthesis of mucins in a patient by administering a nutritional composition to the patient wherein the nutritional composition contains a therapeutically effective amount of threonine. By increasing the synthesis of mucins, a variety of disease states characterized by alterations to the mucin levels, such as, intestinal inflammatory and bacterial infections or other like disease states, can be effectively treated.

Mucins are glycoproteins which are a primary component of the viscoelastic gel, or mucus, which covers most of the mucosal surfaces of the gastrointestinal tract and lungs. They are continuously secreted from the surfaces of the lung and gastrointestinal tract; for example from the goblet cells. They are in the form of large marcomolecules composed of a peptide core and oligosaccharide side chains. The oligosaccharide side chains are linked via O-glycosidic bonds to serine and threonine residues in the peptide core. The oligosaccharide side chains constitute approximately 90% of the mass of the mucins. Threonine constitutes about 22% by weight of the peptide core.

The mucus acts to protect the epithelial cells of the gastrointestinal tract and lungs from toxins such as acids, bile, digestive enzymes and from enteric bacteria and their toxins (Neutra, M. R. and Forstner, J. F.; 1987; *Physiology of the Gastrointestinal Tract*, second edition, Raven Press, N.Y., pages 975 to 1009). Hence the mucus functions as a major, local defense barrier which acts to prevent the invasion and systemic spread of bacteria and endotoxins normally present in the gastrointestinal tract or lungs. Hence the healthy status of the mucus is important to health.

However, many disease states are characterized by alterations in the mucus composition. For example, histochemical studies have demonstrated well characterized abnormalities in mucins during malignancy, cystic fibrosis, chronic inflammatory bowel diseases, ulcerative colitis and Crohn's disease and during infection with intestinal nematode parasites (Tse, S-L, and Chadee, K; 1992; *Infection and Immunity*, Vol. 60, No 4, pages 1603–1612). Also, non-steroidal anti-inflammatory drugs are known to increase the risk of damage to mucosa by acid and pepsin. Also, patients undergoing inflammatory response may have impaired mucin production. The results of these changes or impairments are a variety of adverse effects; including bacterial translocation, gastritis, gastric erosions, peptic ulceration, and invasions of pathogenic bacteria.

There is therefore a need for a method of maintaining or improving the synthesis of mucins.

SUMMARY OF THE INVENTION

This invention provides methods for maintaining, improving or increasing the synthesis of mucins in a patient by administering a nutritional composition or supplement that contains a therapeutically effective amount of threonine. It has been surprisingly found that administering to a patient a therapeutically effective amount of threonine has a beneficial effect on the treatment of a variety of disease states characterized by alterations to the mucin levels, the condition of the mucus in general and other like beneficial effects.

In an embodiment, the present invention includes a method of treating a disease state characterized by alterations to the mucin levels in a patient wherein the method comprises enterally administering to the patient a nutritional composition which has a protein source including amino acids wherein threonine comprises at least 5.5% by weight of the amino acids.

In an embodiment, the present invention includes a method for maintaining the synthesis of mucins in a patient wherein the method comprises enterally administering to the patient a nutritional composition which has a protein source including amino acids wherein threonine comprises at least 5.5% by weight of the amino acids.

In an embodiment, the present invention includes a method for maintaining the synthesis of mucins in a patient wherein the method comprises enterally administering to the patient a nutritional composition which includes a protein source containing a therapeutically effective amount of threonine, a carbohydrate source and a lipid source including a mixture of medium chain triglycerides and long chain triglycerides.

In an embodiment, the present invention includes a method of treating a disease state characterized by alterations to the mucin levels in a patient. The method comprises enterally administering to the patient a nutritional composition which has a protein source including amino acids wherein threonine comprises at least 7.4% by weight of the amino acids.

In an embodiment, the present invention includes a method for maintaining the synthesis of mucins in a patient. The method comprises enterally administering to the patient a nutritional composition which has a protein source including amino acids wherein threonine comprises at least 7.4% by weight of the amino acids.

In an embodiment, the present invention includes a method for increasing the synthesis of mucins wherein the method comprises supplementing a diet of a patient by adding a therapeutically effective amount of threonine to the diet.

In an embodiment, the present invention includes a method for increasing the synthesis of mucins in a patient wherein the method comprises administering to the patient a nutritional composition that contains threonine in an amount of at least 30% a daily recommended amount of threonine.

In an embodiment, the present invention provides a method for treating intestinal inflammation in a patient. The method includes administering a therapeutically effective amount of threonine.

In an embodiment, the present invention provides a method for treating intestinal bacterial infection in a patient. The method includes administering a therapeutically effective amount of threonine.

In an embodiment, the present invention provides a method for reducing oxidative stress due to acute intestinal inflammation. The method includes administering a therapeutically effective amount of threonine.

An advantage of the present invention is that it provides improved methods for maintaining, improving or increasing the synthesis of mucins in a patient.

A further advantage of the present invention is that it provides methods for maintaining, improving or increasing the synthesis of mucins in a patient by administering a nutritional composition to the patient wherein the nutritional composition contains a therapeutically effective amount of threonine.

Yet another advantage of the present invention is that it provides methods for maintaining, improving or increasing the synthesis of mucins in a patient by increasing the food efficiency in a diet administered to the patient wherein the diet contains a therapeutically effective amount of threonine.

A still further advantage of the present invention is that it provides methods for treating a variety of disease states.

Another advantage of the present invention is that it provides methods for treating intestinal inflammation.

Still another advantage of the present invention is that it provides methods for treating intestinal bacterial infection.

An additional advantage of the present invention is that it provides methods for reducing oxidative stress due to acute intestinal inflammation by increasing the synthesis of mucins in a patient.

Additional features and advantages of the present invention are described in, and will be apparent from, the detailed description of the presently preferred embodiments.

DETAILED DESCRIPTION OF THE PRESENTLY PREFERRED EMBODIMENTS

Figure 1:
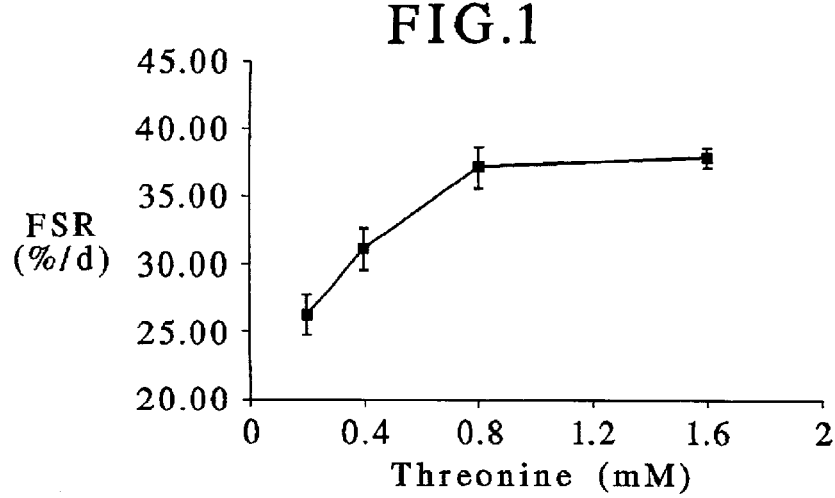
FIG. 1 illustrates graphically the effect of threonine concentration on the fractional synthesis rate of mucoproteins.

The present invention provides methods for maintaining, improving or increasing the synthesis of mucins by administering to a patient a nutritional composition that contains a therapeutically effective amount of threonine. The invention provides methods of treating a variety of disease states characterized by alterations to the mucin levels, such as, intestinal inflammatory and bacterial infections or other like disease states.

The invention is based on the finding that enterally administering nutritional composition which contains a protein source enriched in threonine has a beneficial effect on the synthesis of mucins. The protein source may be any suitable source of amino acids that is enriched in threonine. For example, the protein source may be milk protein, egg white, caseino-glyco-macropeptide, whey protein, casein protein, soy protein, rice protein, pea protein or oat protein, or mixtures of these proteins. Also, the protein source may be in the form of intact protein, hydrolyzed protein, or mixtures thereof. Further, if desired, the protein source may be in the form of free amino acids. In an embodiment, the protein may be in the form of mixtures of intact protein or hydrolyzed protein, with free amino acids.

In an embodiment, threonine provides at least 5.5% by weight of the amino acids of the protein source. The amount of threonine can also include at least 6% by weight of the amino acids and preferably at least 7.4% by weight of the amino acids. This may be obtained by using a protein source which is naturally enriched in threonine or by supplementing other protein sources with threonine. A protein source which is naturally enriched in threonine is particularly preferred; for example sweet whey protein or caseino-glyco-macropeptide. Sweet whey protein has a threonine content of about 7.4% by weight of amino acids and caseino-glyco-macropeptide has a threonine content of about 14% by weight of amino acids.

For patients suffering from malabsorption or intolerance to intact proteins, the protein source is preferably based upon hydrolyzed protein. Especially preferred in this regard is hydrolyzed sweet whey protein. Using hydrolyzed sweet whey provides the advantage of a naturally enriched threonine content while providing nutrition to malabsorbing patients or patients with intolerance to intact proteins.

The protein source preferably provides about 10% to about 20% of the energy of the nutritional composition. For example, the protein source may provide about 15% to about 18% of the energy of the nutritional composition.

The nutritional composition may also include a carbohydrate source. The carbohydrate source preferably provides about 35% to about 65% of the energy of the nutritional composition, preferably 40% to 60% of the energy of the nutritional composition. For example, the carbohydrate source may provide about 51% of the energy of the composition. Several carbohydrates may be used including maltodextrin, corn starch, modified starch, or sucrose, or mixtures thereof. Preferably the composition is free from lactose.

The nutritional composition may further include a lipid source. Preferably the lipid source provides about 20% to about 50% of the energy of the nutritional composition; especially 25% to about 40% of the energy of the nutritional composition. For example, the lipid source may provide about 33% of the energy of the nutritional composition.

The lipid source may comprise a mixture of medium chain triglycerides (MCT) and long chain triglycerides (LCT). The lipid source preferably includes at least 30% to about 80% by weight of medium chain triglycerides. For example, medium chain triglycerides may make up about 70% by weight of the lipid source. Suitable sources of long chain triglycerides are sunflower oil, rapeseed oil, soy oil, milk fat, corn oil and soy lecithin. Fractionated coconut oils are a suitable source of medium chain triglycerides.

The lipid profile of the enteral composition is preferably designed to have a polyunsaturated fatty acid omega-6 (n-6) to omega-3 (n-3) ratio of about 1:1 to about 10:1. For example, the n-6 to n-3 fatty acid ratio may be about 6:1 to about 9:1.

The nutritional composition preferably includes a complete vitamin and mineral profile. For example, sufficient vitamins and minerals may be provided to supply about 75% to about 250% of the recommended daily allowance of the vitamins and minerals per 1000 calories of the nutritional composition.

The nutritional composition preferably has an energy content of about 800 kcal/1 to about 1200 kcal/1; for example an energy content of about 1000 kcal/1.

The nutritional composition may be in any suitable form. For example, the nutritional composition may be in the form of a soluble powder, a liquid concentrate, or a ready-to-drink formulation. Alternatively, the nutritional composition may be in solid form; for example in the form of a ready-to-eat bar or breakfast cereal. Ready to drink formulations are particularly preferred. The composition may be fed to a patient via a nasogastric tube, jejunum tube, or by having the patient drink or eat it. Various flavors, fibers, sweeteners, and other additives may also be present.

The nutritional composition may be used as a nutritional support for patients suffering from, or at risk of, impaired or reduced mucin production. For example, the nutritional composition may be used as a nutritional support for patients undergoing an inflammatory response, suffering from malnutrition, suffering from cystic fibrosis, malignancy, chronic inflammatory bowel diseases, ulcerative colitis and Crohn's disease, undergoing treatment which includes the administration of non-steroidal anti-inflammatory drugs, and other like disease states. The nutritional composition may also be used to restore mucin production after total parenteral nutrition.

The amount of the nutritional composition required to be fed to a patient will vary depending upon factors such as the patient's condition, the patient's body weight, the age of the patient, and whether the nutritional composition is the sole source of nutrition. However the required amount may be readily set by a medical practitioner. In general, a sufficient amount of the nutritional composition is administered to provide the patient with about 1 g protein to about 4.0 g protein per kg of body weight per day and about 0.05 g to about 0.4 g of threonine per day. For example, an adult patient may be administered about 1.5 g protein to about 2.0 g protein per kg of body weight per day and about 0.07 g to about 0.2 g of threonine per day. If the nutritional composition is used as a supplement to other foods, the amount of the nutritional composition that is administered daily may be decreased accordingly.

The nutritional composition may be taken in multiple doses, for example 2 to 5 times, to make up the required daily amount or may be taken in a single dose.

In an embodiment, the present invention includes a method of treating a disease state characterized by alterations to the mucin levels in a patient. The method includes enterally administering to the patient a nutritional composition which has a protein source including amino acids wherein threonine includes at least 5.5% by weight the amino acids. The amount of threonine can also include at least 6.0% and preferably at least 7.4% by weight of the amino acids.

In an embodiment, the present invention includes increasing the synthesis of mucins in a patient by supplementing a diet of a patient with a therapeutically effective amount of threonine. The amount of threonine added to the diet can include at least 0.2 mM. Preferably, the amount of threonine also ranges from about 0.2 mM to about 0.8 mM.

The amount of threonine to be added can be based on the recommended daily dosages or requirements for threonine. In an embodiment, the amount of threonine added to the diet includes at least 30% of the recommended daily amount, preferably at least 60%, and most preferably at least 100% of this amount.

In an embodiment, the present invention provides a method for increasing the synthesis of mucins by increasing the food efficiency in a diet of a patient. The food efficiency represents the ratio between the body weight gain and the quantity of ingested food during a diet period as detailed below in Example 4. The food efficiency and thus the synthesis of mucins can be increased by administering to the patient a nutritional composition that contains a therapeutically effective amount of threonine. For example, the amount of threonine can be based on the daily recommended amount of threonine as previously discussed.

An embodiment of the invention provides methods of treating disease states characterized by alterations to mucin levels in a patient. The disease states can include a variety of disease states, such as intestinal inflammation and bacterial infection or other like disease states, as previously discussed. In an embodiment, the invention provides methods for treating intestinal inflammation, for treating intestinal bacterial infections, for reducing oxidative stress due to acute intestinal inflammation and for treating other like disease states. The methods for treating disease states provide administering to a patient a therapeutically effective amount of threonine as previously discussed. The threonine can be administered as part of a nutritional composition, supplement or other like nutritional substance.

By way of example and not limitation, examples of the present invention are as follows:

EXAMPLE 1

Twenty four male Wistar rats, each weighing about 200 g, are used. The rats have free access to water. The rats are divided into 3 groups of 8 rats with each rat in a separate cage.

Each group of rats has free access, for 3 days, to a control diet based upon soy protein supplemented with Met. Thereafter, each group is fed, once a day, an amount of the control diet sufficient to meet 80% of the physiological requirements for growing of each rat. Thereafter, one group (the control group) is fed in the same fashion for the remainder of the trial. The remaining groups are then starved for a period of three days. The rats have free access to water during this time.

The remaining two groups of rats are then each fed a separate diet, once a day, in an amount of the control diet sufficient to meet 80% of the physiological requirements for the growing of each rat. One group (group A) is fed an enteral formula based upon acid whey supplemented with 5% cellulose. The second group (group 1) is fed a freeze dried enteral formula based upon sweet whey (available from Nestle Clinical Nutrition under the trademark PEPTAMEN(®) supplemented with 5% cellulose.

The protein content of the diets are as follows: the control diet contains 19.02 g of protein per gram of diet, enteral formula based upon acid whey contains 15.67 g of protein per gram of diet, and the enteral formula based upon sweet whey contains 15.63 g of protein per gram of diet. Threonine provides about 7.4% by weight of protein in the enteral formula based upon sweet whey. In the enteral formula based upon acid whey, threonine provides less than 5% by weight of protein.

Results 1

After three days, gastro-intestinal mucosa is collected from each rat. The threonine content of the mucosa is then determined as follows:

| Group | Protein Intake (g/3 days) | Thr Intake (mg/3 days) | Thr content in Mucosa Protein (mg/g mucosa protein) |
|---|---|---|---|
| Control | 8.2 | 270 | 4.69 |
| A | 6.2 | 258 | 3.81 |
| 1 | 6.3 | 410 | 4.30 |

The results of Example 1 indicate that the starved rats of group 1 have a higher content of threonine in the mucosa protein than those of group A and a threonine content slightly lower than the normal content of those of the control group. This indicates a rise in the production of mucins in the rats of group 1.

EXAMPLE 2

An isotonic liquid diet is used. The diet is available from Nestle Clinical Nutrition under the trademark PEPTAMEN®. The diet has the following components:

| Nutrient | Amount per 1000 ml |
| --- | --- |
| Protein (hydrolyzed sweet whey) | 40 g |
| Carbohydrate (maltodextrin, corn starch) | 127 g |
| Lipid (medium chain triglycerides, sunflower oil, soy lecithin) | 39 g |
| Vitamin A | 4000 IU |
| Vitamin D | 280 IU |
| Vitamin E | 28 IU |
| Vitamin K | 80 micrograms |
| Vitamin C | 140 mg |
| Thiamin | 2 mg |
| Riboflavin | 2.4 mg |
| Niacin | 28 mg |
| Vitamin B6 | 4 mg |
| Folic acid | 540 micrograms |
| Pantothenic acid | 14 mg |
| Vitamin B 12 | 8 micrograms |
| Biotin | 400 micrograms |
| Choline | 450 mg |
| Taurine | 80 mg |
| L-carnitine | 80 mg |
| Minerals Calcium, Phosphorus, Magnesium, Zinc, Iron, Copper, Manganese, Iodine, Sodium, Potassium, Chloride, Chromium, Molybdenum, Selenium | |

The diet has an energy density of 1000 kcal/1 and the protein provides 16% of energy, the carbohydrate provides 51% of energy, and the lipid provides 33% of energy. Threonine provides about 7.4% by weight of the protein source. Ten patients, of both sexes and between the ages of 20 to 60 years, are recruited for the study. All patients have been diagnosed as suffering from Crohn's disease, and the diagnosis has been confirmed by histology, radiology, or both. All patients are given barium meal, and radiography is used to assess the disease site in the small bowel. The patients are also are subjected to endoscopic assessment. A score of 0 to 3 (0=normal, 1=mild inflammation, 2=moderate inflammation, and 3=severe inflammation) is assigned to each area of the bowel which is inspected. The bowel areas include, for example, the terminal ileum, caecum, descending colon, transverse colon, ascending colon, sigmoid colon and rectum. Also, an assessment is made upon the condition of the mucus in area of the bowel which is inspected. A score of 0 to 3 (0=normal, 3=severe reduction) is assigned to each area.

Each patient in the study is fed the PEPTAMEN® product as the sole source of nutrition for a period of 8 weeks. Administration of the nutritional composition is under the supervision of a dietitian and is effected orally or by nasogastric tube, as desired by the patient. The intake of the nutritional composition is adjusted on the basis of tolerance, palatability and weight gain. After the 8 weeks, each patient again undergoes endoscopic assessment and inflammation and mucus values are assigned.

Results 2

In general, the endoscopic assessment and mucus conditions in all of patients have improved after administering the nutritional composition to the patients as discussed in Example 2. Therefore, the treatment effectively resulted in the remission of Crohn's disease in most cases.

EXAMPLE 3 (In vitro)

The effect of threonine supplementation on the mucin synthesis rate was analyzed in vitro in HT29-MTX cells (human colonic carcinoma cells). HT29-MTX cells were grown in normal Dulbecco's modified minimum essential medium (DMEM) supplemented with 10% (v/v) heat-inactivated fetal bovine serum (Life Technologies) and containing 25 mM glucose, 1% non-essential amino acids (Life Technologies), 2 mM glutamine (AJINOMOTO CO), 85 mg/L penicillin-streptomycin, 50 mg/L gentamicin, and 1.5 mg/L Amphotericin B (Life Technologies). Cells were cultured at 37° C. in an atmosphere containing 10% $CO_2$:90% air. The culture medium was changed daily. Experiments were carried out in T75 $cm^2$ culture flasks between passages 10 to 20. Studies were performed in the late post-confluent period (21 days after seeding), when all cells display a mucin-secreting phenotype.

For the experiment, cells were grown in the normal DMEM until confluency (7 days after seeding). Then from day 7 to 21 after seeding, several concentrations of threonine in the DMEM were tested, namely, 0.2 mM, 0.4 mM, 0.8 mM and 1.6 mM. At day 20, L-(3-$^3$H) threonine (30 microCi/Flask) was added to a fresh 10 mL culture medium. The incorporation of the radioactive tracer to newly synthesized mucoproteins was determined for the following 24 hour period.

After 24 hours of metabolic labeling, the culture medium of cells was removed. Cells were washed twice with 10 ml of 1×phosphate buffer solution (PBS) and recovered using a rubber scraper. Cells were homogenized in 0.05M Tris/HCl buffer pH 7.50 using a polytron at a low setting (6.000 rpm, 30 sec, 4' C.). An aliquot of each homogenate was removed for the measurement of the specific radioactivity of the intraceelular free threonine considered as the precursor pool. Mucoproteins were purified from the cell homogenates by a size exclusion chromatography after a partial enzymatic digestion of non-highly glycosylated and thus protected proteins. Purified mucins were hydrolyzed with 6M HCl (24 h at 100° C.), and their amino acid composition was determined by HPLC. The outlet of the UV detector was connected to a radioactive detector (Radiomatic 500TR, Packard) to measure the $^3$H-threonine incorporated in mucoproteins. The fractional synthesis rate (FSR) of mucoproteins was calculated and expressed in percent/day (%/d): (FSR =(Specific radioactivity of mucoprotein bound threonine/Specific radioactivity of intracellular free threonine) * 100).

Results 3

The results of Example 3 are shown in FIG. 1 which demonstrates the effect of the threonine concentration on the fractional synthesis rate of mucoproteins ("mucoprotein FSR"). The mucoprotein FSR was determined for each of the varying concentrations of threonine (mM) in the culture medium of HT29-MTX cells as further shown in FIG. 1. The data values are mean values±SEM (n=6) wherein the data values that do not share a common letter are significantly different (p<0.05).

The mucoprotein FSR increased significantly from 0.2 mM (26.4±1.4%) to 0.8 mM (37.3±1.4%) of threonine and reached a plateau at about 0.8 mM of threonine. The mucoprotein FSR generally increased with the level of threonine in the culture medium under conditions which are not limiting in threonine for the cell culture as the cell number and viability are not disturbed.

These results clearly indicate that the threonine bioavailability in the culture medium can significantly influence the mucoprotein synthesis rate in vitro. Thus, whatever the disease state considered (Inflammatory Bowel Disease, infection, Crohn's disease, or other like disease states), the threonine requirement is increased for the synthesis of threonine rich inflammatory proteins at the expense of the mucoprotein synthesis. Thus, threonine supplementation can be an efficient and effective nutritional intervention to stimulate or to restore the mucoprotein synthesis rate, and thus to facilitate improved epithelial cell protection.

EXAMPLE 4 (In vivo)

The effect of the threonine content in the diet on the mucin synthesis rate was analyzed in vivo in growing rats. Thirty two male Sprague-Dawley rats (90 g) were used. They were randomly divided into 4 groups of 8 rats and separated in individual cages. Rats had free access to water during all the experiments.

After an adaptation period of 6 days on a chow diet, rats were adapted (free access) to their experimental diets for 3 days. Experimental diets were based on free amino acids (semi-synthetic diet, 12.5% proteins) and varying amounts of threonine: A) a threonine requirement for growing rats according to the recommendations of the National Research Council (revised edition of 1995); B) 60% of the threonine requirement; C) 30% of the threonine requirement; and D) 150% of the threonine requirement. Rats of each group were fed with the experimental diets for 14 days. Groups A, B and D were pair-fed with group C.

Before the sacrifice of rats, a flooding dose of 1-$^{13}$C-Valine was performed in the lateral tail vein of animals. Each animal received a bolus of 150 micromole L-$^{13}$C-Valine (99%$^{13}$C)/100 g body weight. Animals were sacrificed after anesthesia by exsanguination from the abdominal aorta between 35 to 53 minutes after the 1-$^{13}$C-Valine injection. Intestinal mucosal samples were obtained by scrapping with a glass slide and thereafter immediately freezing them in liquid nitrogen.

Rat mucosal samples were gently homogenized in 0.05M Tris/HCl buffer pH 7.50 using a polytron at a low setting (6,000 rpm, 30 sec, 40C). An aliquot of each sample homogenate was used to measure the 1-$^{13}$C-Valine enrichment in the intracellular pool that was considered as $^3$C-enrichment of the precursor pool. Thereafter, mucoproteins were purified as described previously for the in vitro experiment. 1-$^3$C-Valine enrichments in mucoprotein were measured by mass spectrometry.

Results 4

Figure 2:
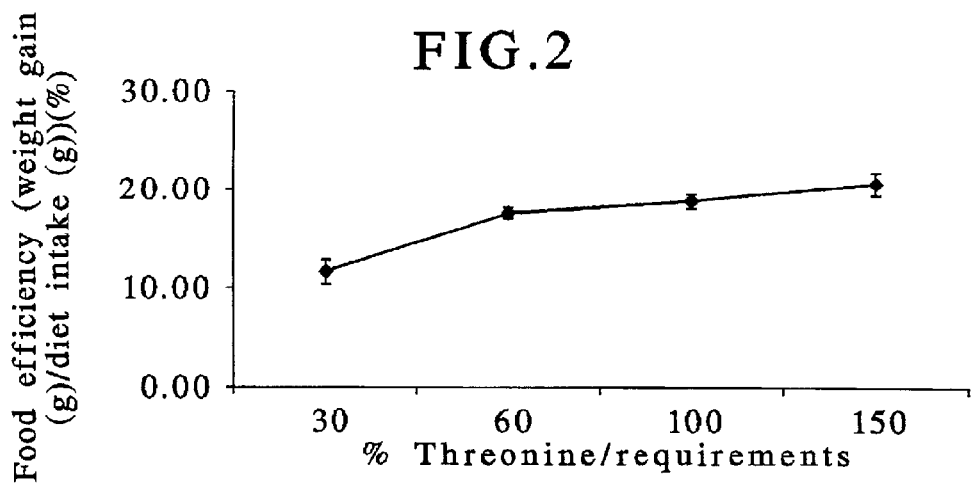
FIG. 2 illustrates graphically the effect of a threonine requirement on the food efficiency of a diet.

As shown in FIG. 2, the effect of the threonine requirement and percentages thereof on the food efficiency of a diet was evaluated. As discussed in Example 4, the diets contained 30%, 60%, 100%, and 150% of the threonine requirements of rats. The food efficiency was calculated as the ratio between the body weight gain (grams) and the quantity of ingested food (grams) during the 14 days, and expressed in percentage. The data values are mean values±SEM (n=8). The data values that do not share a common letter are significantly different (p<0.05).

As further illustrated in FIG. 2, the food efficiency of the four diets varied with respect to the percentage of threonine requirement in the diet. It was significantly lower for the diet containing 30% of the threonine requirements of rats (11.8±1.2%) than for diets containing 60% (17.5±0.5%), 100% (18.8±0.8%) and 150% (20.6±1.3%) of the threonine requirements.

As shown in Table 1 (below) and FIG. 3, the effect of the percentage of the threonine requirement on the fractional synthesis rates of mucoproteins was evaluated.

TABLE 1

| Diet | % Threonine requirements | FSR (%/d) | Average ± SEM |
|------|--------------------------|-----------|---------------|
| C    | 30%                      | 123.5     | 101.8 ± 9.4   |
|      |                          | 109.8     |               |
|      |                          | 80.4      |               |
|      |                          | 93.6      |               |
| B    | 60%                      | 178.3     | 139.8 ± 19.3  |
|      |                          | 123.9     |               |
|      |                          | 117.4     |               |
| A    | 100%                     | 157.3     | 143.5 ± 6.3   |
|      |                          | 146.2     |               |
|      |                          | 135.3     |               |
| D    | 150%                     | 117.6     | 138.5 ± 12.0  |
|      |                          | 159.1     |               |
|      |                          | 138.9     |               |

Table 1 compares the fractional synthesis rate of mucoproteins in jejunum of growing rats with respect to Diet A (100% of threonine requirements), Diet B (60% of threonine requirements), Diet C (30% of threonine requirements), and Diet D (150% of threonine requirements). FIG. 3 is a graphical illustration of Table 1. The data values are mean values±SEM as further illustrated in FIG. 3.

Figure 3:
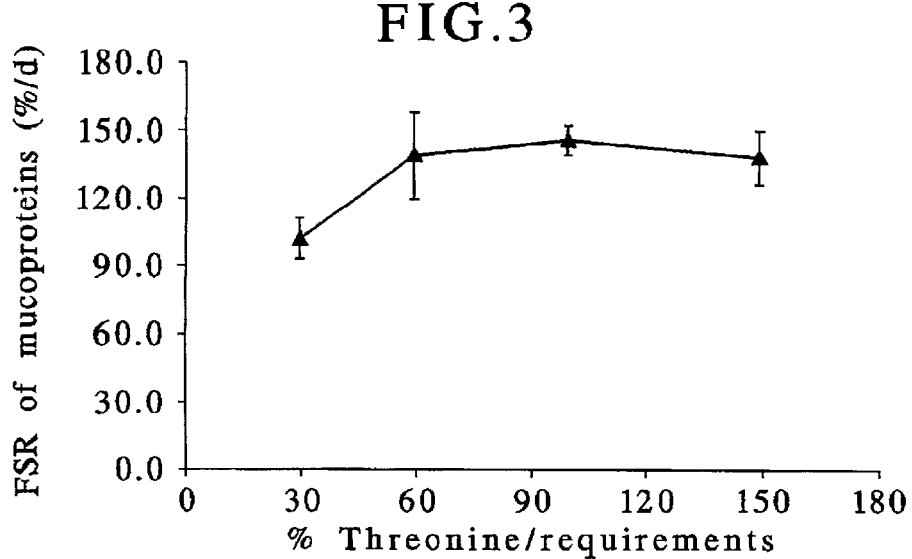
FIG. 3 illustrates graphically the effect of a threonine requirement on the fractional synthesis rates of mucoproteins.

As shown in Table 1 and FIG. 3, the synthesis rate of mucoproteins was the lowest in the jejunum of rats fed with the diet that is the most deficient in threonine (30% of threonine requirements). As shown, the mucoprotein fractional synthesis rate in jejunum was 143%/day with the control diet (100% of threonine requirements), and it decreased to 101%/day with the diet containing 30% of threonine requirements. However, the mucoprotein synthesis rate did not increase with the diet containing 150% of threonine requirements than what was observed in the control diet.

These results indicate that if threonine requirements for growth are not covered by the diet, the mucoprotein synthesis rate is decreased. Thus, the threonine content of the diet has an effect on both growth and mucoprotein synthesis rate in vivo in rats. This demonstrates that not only growth but also mucoproteins synthesis is effected when the diet is deficient in threonine. Accordingly, if threonine requirements are not adequately provided by the diet, threonine supplementation can be an effective and efficient nutritional strategy to increase or to restore the mucoprotein synthesis rate, and thus to assure a better epithelial cell protection.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that all such changes and modifications be covered by the appended claims.

We claim:

1. A method of treating a disease state characterized by alterations to the mucin levels in a patient, the method comprising enterally administering to the patient a nutritional composition which has a protein source including amino acids wherein threonine comprises at least 5.5% by weight of the protein source.

2. The method of claim 1 wherein threonine comprises at least 6% by weight of the protein source.

3. The method of claim 1 wherein the protein source comprises sweet whey protein.

4. The method of claim 3 wherein the sweet whey protein is hydrolyzed.

5. The method of claim 1 wherein the nutritional composition further comprises a lipid source and a carbohydrate source.

6. The method of claim 5 wherein the lipid source comprises a mixture of medium chain triglycerides and long chain triglycerides.

7. The method of claim 6 wherein the lipid source comprises 30% to 80% by weight of medium chain triglycerides.

8. A method for maintaining the synthesis of mucins in a patient, the method comprising enterally administering to the patient a nutritional composition which has a protein source including amino acids wherein threonine comprises at least 5.5% by weight of the protein source.

9. The method of claim 8 wherein the protein source comprises sweet whey protein.

10. The method of claim 8 wherein the nutritional composition further comprises a lipid source and a carbohydrate source.

11. The method of claim 10 wherein the lipid source comprises a mixture of medium chain triglycerides and long chain triglycerides.

12. The method of claim 11 wherein the lipid source comprises 30% to 80% by weight of medium chain triglycerides.

13. The method of claim 9 wherein the sweet whey protein is hydrolyzed.

14. A method of treating a disease state characterized by alterations to the mucin levels in a patient, the method comprising enterally administering to the patient a nutritional composition that has a protein source including amino acids wherein threonine comprises at least 7.4% by weight of the protein source.

15. The method of claim 14 wherein threonine comprises at least 14% by weight of the protein source.

16. The method of claim 14 wherein the protein source comprises a sweet whey protein.

17. The method of claim 14 wherein the protein source comprises a caseino-glyco-macropeptide.

18. A method for maintaining the synthesis of mucins in a patient, the method comprising enterally administering to the patient a nutritional composition which has a protein source including amino acids wherein threonine comprises at least 7.4% by weight of the protein source.

19. The method of claim 18 wherein threonine comprises at least 14% by weight of the protein source.

20. The method of claim 18 wherein the protein source comprises a sweet whey protein.

21. The method of claim 18 wherein the protein source comprises caseino-glyco-macropeptide.

22. A method for increasing the synthesis of mucins in a patient, the method comprising supplementing a diet of the patient by adding a nutritional composition including a protein source and a therapeutically effective amount of threonine to the diet wherein threonine comprises at least 5.5% by weight of the protein source.

23. A method for increasing the synthesis of mucins in a patient, the method comprising administering to the patient a nutritional composition which has a protein source containing threonine at least 30% of a daily recommended amount of threonine wherein threonine comprises at least 5.5% by weight of the protein source.

24. The method of claim 23 wherein the amount of threonine comprises at least 60% of the daily recommended amount of threonine.

25. The method of claim 23 wherein the amount of threonine comprises at least 100% of the daily recommended amount of threonine.

26. A method of treating intestinal inflammation in a patient, the method comprising administering to the patient a nutritional composition that has a protein source including amino acids wherein the nutritional composition includes a therapeutically effective amount of threonine that is at least 5.5% by weight of the protein source.

27. The method of claim 26 wherein the threonine is provided as a nutritional supplement.

28. The method of claim 27 wherein the nutritional supplement contains a sweet whey protein.

29. A method of treating intestinal bacterial infection in a patient, the method comprising administering a nutritional composition that has a protein source including amino acids to the patient wherein the nutritional composition contains a therapeutically effective amount of threonine that is at least 5.5% by weight of the protein source.

30. The method of claim 29 wherein the threonine is provided as a nutritional supplement.

31. The method of claim 30 wherein the nutritional supplement contains a sweet whey protein.

32. A method of reducing oxidative stress due to acute intestinal inflammation in a patent, the method comprising administering a nutritional composition that has a protein source including amino acids to the patient wherein the nutritional composition includes a therapeutically effective amount of threonine that is a least 5.5% by weight of the protein source.

33. The method of claim 32 wherein the nutritional composition contains threonine in an amount of at least 0.2 mM.

34. The method of claim 32 wherein the nutritional composition contains a sweet whey protein.

35. A method for maintaining the synthesis of mucins in a patient, the method comprising enterally administering to the patient a nutritional composition which includes a protein source containing a therapeutically effective amount of threonine that is at least 5.5% by weight of the protein source, a carbohydrate source and a lipid source including a mixture of medium chain triglycerides and long chain triglycerides wherein the protein source provides 10% to 20% of the energy of the nutritional composition.

36. A method for increasing the synthesis of mucins in a patient, the method comprising supplementing a diet of the patient by adding a nutritional composition that includes a protein source and a therapeutically effective amount of threonine to the diet wherein the amount of threonine is at least 0.2 mM and at least 5.5% by weight of the protein source.

37. A method for increasing the synthesis of mucins in a patient, the method comprising supplementing a diet of the patient by adding a nutritional composition that includes a protein source and a therapeutically effective amount of threonine to the diet wherein the amount of threonine is at least 0.8 mM end at least 5.5% by weight of the protein source.

38. A method for increasing the synthesis of mucins in a patient, the method comprising supplementing a diet of the patient by adding a nutritional composition that includes a protein source and a therapeutically effective amount of threonine to the diet wherein the amount of threonine ranges from about 0.2 mM to about 0.8 mM and at least 5.5% by weight of the protein source.

39. A method of treating intestinal inflammation in a patient, the method comprising administering to the patient a therapeutically effective amount of threonine wherein the threonine is provided as a nutritional supplement that includes a protein source, and wherein the nutritional supplement contains threonine in an amount of at least 0.2 mM and at least 5.5% by weight of the protein source.

40. A method of treating intestinal bacterial infection in a patient, the method comprising administering a nutritional composition to the patient wherein the nutritional composition contains a therapeutically effective amount of threonine wherein the threonine is provided as a nutritional supplement that includes a protein source and contains threonine in an amount of at least 0.2 mM and at least 5.5% by weight of the protein source.

* * * * *